US012755363B2

(12) United States Patent
Zhao et al.

(10) Patent No.: US 12,755,363 B2
(45) Date of Patent: Oct. 6, 2026

(54) METHOD AND APPARATUS FOR DETECTING DEFECT ON INSULATION COATING ON BATTERY ELECTRODE PLATE, AND COMPUTER DEVICE

(71) Applicant: CONTEMPORARY AMPEREX TECHNOLOGY (HONG KONG) LIMITED, Hong Kong (CN)

(72) Inventors: Baiquan Zhao, Ningde (CN); Dajun Ni, Ningde (CN); Jun Hu, Ningde (CN); Xianfeng Xie, Ningde (CN); Wen Chang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 313 days.

(21) Appl. No.: 18/592,211

(22) Filed: Feb. 29, 2024

(65) Prior Publication Data

US 2024/0249402 A1 Jul. 25, 2024

Related U.S. Application Data

(63) Continuation of application No. PCT/CN2022/085690, filed on Apr. 8, 2022.

(51) Int. Cl.

*G06T 7/00* (2017.01)
*G06T 7/13* (2017.01)
*G06T 7/62* (2017.01)

(52) U.S. Cl.

CPC .............. *G06T 7/0004* (2013.01); *G06T 7/13* (2017.01); *G06T 7/62* (2017.01)

(58) Field of Classification Search

CPC . G06T 7/0004; G06T 7/13; G06T 7/62; Y02E 60/10; H01M 10/058; H01M 10/04;
(Continued)

(56) References Cited

U.S. PATENT DOCUMENTS

| | | | | |
|---|---|---|---|---|
| 2020/0033733 | A1 | 1/2020 | Thompson et al. | |
| 2023/0327222 | A1* | 10/2023 | Hong ................ | G01N 21/8851 29/623.1 |

FOREIGN PATENT DOCUMENTS

| | | | |
|---|---|---|---|
| CN | 105244470 | A | 1/2016 |
| CN | 205122710 | U | 3/2016 |

(Continued)

OTHER PUBLICATIONS

International Search Report for PCT application No. PCT/CN2022/085690, dated Jan. 4, 2023.

(Continued)

*Primary Examiner* — Han Hoang
(74) *Attorney, Agent, or Firm* — Ladas & Parry LLP

(57) ABSTRACT

Method and apparatus for detecting a defect on an insulation coating on a battery electrode plate are disclosed. The method includes: obtaining an electrode plate image obtained by photographing an electrode plate, where the electrode plate image includes at least one complete electrode plate; determining an insulation coating region and a tab region in the electrode plate image; determining a defect detection region in the insulation coating region in the electrode plate image based on the insulation coating region and the tab region; and performing defect detection on the defect detection region to obtain a defect detection result.

(Continued)

The method implements detection on the insulation coating on the electrode plate before combination, and can detect whether a defect exists in the insulation coating region.

16 Claims, 8 Drawing Sheets

(58) Field of Classification Search
CPC ................ H01M 4/04; G01N 21/8851; G01N 2021/8858; G01N 2021/8864; G01B 11/028
See application file for complete search history.

(56) References Cited

FOREIGN PATENT DOCUMENTS

| | | | | | |
|---|---|---|---|---|---|
| CN | 109358070 | A | | 2/2019 | |
| CN | 210730683 | U | | 6/2020 | |
| CN | 111681241 | A | * | 9/2020 | ........... G06T 7/0004 |
| CN | 211578881 | U | | 9/2020 | |
| CN | 112215825 | A | | 1/2021 | |
| CN | 212576731 | U | | 2/2021 | |
| CN | 113313711 | A | * | 8/2021 | ............... G06T 7/66 |
| CN | 113526066 | A | | 10/2021 | |
| CN | 114022418 | A | * | 2/2022 | ............... G06T 7/13 |
| CN | 115797346 | A | | 3/2023 | |
| JP | 2013080667 | A | | 5/2013 | |
| WO | WO-2022052480 | A1 | * | 3/2022 | ......... G01N 21/8914 |

OTHER PUBLICATIONS

Written Opinion of International Searching Authority for PCT application No. PCT/CN2022/085690, dated Jan. 4, 2023.
Notice of Reasons for Refusal, JP application No. 2024-518180, dated May 29, 2025.
Extended European Search Report for EP application No. 22936156.3, dated Dec. 17, 2024.
Decision to Grant a Patent, JP application No. 2024-518180, dated Oct. 2, 2025.
Request for the Submission of an Opinion, KR application No. 10-2024-7011254, dated Sep. 15, 2025.
First Office Action of CN application No. 202280032976.X, dated Apr. 3, 2026.
Notice of Grant of a Patent for an Invention (PCT applications entering the national phase), CN application No. 202280032976.X, dated Apr. 29, 2026.
Y Liu et al. "Research of coating defect testing of insulator", Journal of Tianjin University of Technology and Education, vol. 28, No. 2, Jun. 2018, with English abstract.
S Yin et al. "A detection method of battery glue detects based on machine vision", Machine Manufacturing, vol. 55, No. 629, Jan. 2017, with English abstract.

* cited by examiner

METHOD AND APPARATUS FOR DETECTING DEFECT ON INSULATION COATING ON BATTERY ELECTRODE PLATE, AND COMPUTER DEVICE

CROSS REFERENCE TO RELATED APPLICATION

This application is a continuation of International Patent Application No. PCT/CN2022/085690, filed on Apr. 8, 2022, which is incorporated by reference in its entirety.

TECHNICAL FIELD

The present application relates to the field of battery maintenance technologies, and in particular, to a method and apparatus for detecting a defect on an insulation coating on a battery electrode plate, a computer device, a computer-readable storage medium, a computer program product, and a system for detecting a defect on a battery electrode plate.

BACKGROUND

With the continuous progress of science and technology, lithium-ion batteries have been used in electric vehicles and become one of the main power sources of electric vehicles. The rapid development of the new energy vehicle industry raises quite high requirements on safety, environmental friendliness, and large-current charge-discharge use performance of lithium-ion batteries. In large-scale production, in order to improve performance of a battery, a coating process during manufacturing of lithium-ion batteries is particularly important.

In conventional detection of a defect on a battery electrode plate, two sets of image sensors (for front and back sides) are used to capture images to obtain distances between active substance coatings of the electrode plate and an edge of the electrode plate, a misalignment value of the coatings is obtained through calculation, a control system performs closed-loop control, and a coating region is adjusted until the misalignment value is less than a specified value. A conventional solution for detecting a defect on a battery electrode plate has the disadvantage of low detection accuracy.

SUMMARY

According to various embodiments of the present application, a method and an apparatus for detecting a defect on an insulation coating on a battery electrode plate, a computer device, a computer-readable storage medium, a computer program product, and a system for detecting a defect on a battery electrode plate are provided.

According to a first aspect, the present application provides a method for detecting a defect on an insulation coating on a battery electrode plate, including:

- obtaining an electrode plate image obtained by photographing an electrode plate, where the electrode plate image includes at least one complete electrode plate;
- determining an insulation coating region and a tab region in the electrode plate image;
- determining a defect detection region in the insulation coating region in the electrode plate image based on the insulation coating region and the tab region; and
- performing defect detection on the defect detection region to obtain a defect detection result.

In the method for detecting a defect on an insulation coating on a battery electrode plate, the electrode plate image including at least one entire electrode plate is obtained by photographing the electrode plate, the insulation coating region and the tab region in the electrode plate image are determined, then the defect detection region of the insulation coating region in the electrode plate image is determined based on the insulation coating region and the tab region, and finally defect detection is performed on the defect detection region to obtain the defect detection result. The method implements detection on the insulation coating on the electrode plate before combination, and can detect whether a defect exists in the insulation coating region, so that a defective electrode plate is scrapped in a timely manner, detection accuracy is high, and operating efficiency of a stacking device is further improved.

In an embodiment, the determining an insulation coating region and a tab region in the electrode plate image includes: performing full-image edge finding on the electrode plate image to obtain a primary positioning electrode plate edge; performing secondary positioning based on the primary positioning electrode plate edge to determine the insulation coating region in the electrode plate image; and performing searching based on the insulation coating region to determine the tab region in the electrode plate image. The full-image edge finding and the secondary positioning are performed on the electrode plate image, to find the insulation coating region in the electrode plate image and then find the tab region in the electrode plate image based on the determined insulation coating region, so that different regions in the electrode plate image are found step by step, and detection is accurate and reliable.

In an embodiment, the performing full-image edge finding on the electrode plate image to obtain a primary positioning electrode plate edge includes: performing the full-image edge finding on the electrode plate image in a direction toward a tab from one side away from the tab to obtain the primary positioning electrode plate edge. The full-image edge finding is performed on the electrode plate image in the direction toward the tab from the side away from the tab, so that the primary positioning electrode plate edge can be accurately found.

In an embodiment, the performing the full-image edge finding on the electrode plate image in a direction toward a tab from one side away from the tab to obtain the primary positioning electrode plate edge includes: performing the full-image edge finding on the electrode plate image in the direction toward the tab from the side away from the tab; and if a preset sudden change edge is found, determining that the edge finding succeeds, and determining the found preset sudden change edge as the primary positioning electrode plate edge. When the full-image edge finding is performed on the electrode plate image in the direction toward the tab from the side away from the tab, whether the preset sudden change edge can be found is analyzed, and the preset sudden change edge serves as the primary positioning electrode plate edge if being found, so that edge finding accuracy is further improved.

In an embodiment, the performing secondary positioning based on the primary positioning electrode plate edge to determine the insulation coating region in the electrode plate image includes: determining a target insulation coating region based on the primary positioning electrode plate edge, and performing extraction on the target insulation coating region to determine the insulation coating region in the electrode plate image. After the target insulation coating region is determined based on the primary positioning electrode plate edge, the insulation coating region in the electrode plate image is extracted based on the target insulation coating region, so that the insulation coating region is conveniently and rapidly found.

In an embodiment, the performing searching based on the insulation coating region to determine the tab region in the electrode plate image includes: performing secondary region positioning based on the insulation coating region to determine a target tab detection region; and finding and extracting the tab region in the target tab detection region. The secondary region positioning is performed based on the insulation coating region, and after the target tab detection region is determined, the tab region is found based on the target tab detection region, so that the tab region can also be conveniently and rapidly found.

In an embodiment, the performing secondary region positioning based on the insulation coating region to determine a target tab detection region includes: extracting a primary positioning insulation edge of the insulation coating region; and determining the target tab detection region based on the primary positioning insulation edge. The primary positioning insulation edge of the insulation coating region is extracted, and the target tab detection region is selected based on the primary positioning insulation edge, so that the target tab detection region can be rapidly and accurately determined.

In an embodiment, the finding and extracting the tab region in the target tab detection region includes: extracting a region having a tab gray feature in the target tab detection region to obtain a primary tab region; and determining, based on a region shape and a region size of the primary tab region, whether the primary tab region is a tab, and if the primary tab region is a tab, determining that the tab region is obtained. Primary screening is performed on the target tab detection region based on the tab gray feature to determine the primary tab region, and whether the tab region is found is analyzed based on the region shape and the region size of the primary tab region, so that finding accuracy of the tab region can be ensured.

In an embodiment, the determining a defect detection region in the insulation coating region in the electrode plate image based on the insulation coating region and the tab region includes: performing edge finding on the tab region to obtain a tab edge; obtaining an electrode plate edge based on the tab edge and preset distance data, where the preset distance data is distance data between the tab edge and the electrode plate edge; and determining the defect detection region of the insulation coating region in the electrode plate image based on the primary positioning electrode plate edge, the primary positioning insulation edge, and the electrode plate edge. After the tab region is found, the electrode plate edge is determined based on the tab edge and the preset distance data, and the defect detection region of the insulation coating region can be accurately found based on the primary positioning electrode plate edge, the primary positioning insulation edge, and the electrode plate edge, so that defect detection is subsequently performed.

In an embodiment, the performing defect detection on the defect detection region to obtain a defect detection result includes: performing connected component extraction on the defect detection region; and if a connected component similar to a preset defect region exists, determining that a defect exists. The defect detection result includes defect existence information. The connected component in the defect detection region is extracted and compared with the preset defect region, and whether a defect exists in the defect detection region is analyzed, so that detection is accurate and efficient.

In an embodiment, the performing defect detection on the defect detection region to obtain a defect detection result further includes: if the connected component similar to the preset defect region does not exist, calculating a coating region misalignment value of the electrode plate. The defect detection result includes defect non-existence information and the coating region misalignment value. When a defect does not exist in the defect detection region of the insulation coating region, the coating region misalignment value of the electrode plate is further calculated to analyze whether insulation coating regions on both sides of the electrode plate have the same dimensional widths, so that an electrode plate with an abnormal size is scrapped, and defect detection accuracy of the battery electrode plate is further improved.

In an embodiment, the electrode plate image includes a first electrode plate image and a second electrode plate image that are obtained by photographing the two faces of the electrode plate. The calculating a coating region misalignment value of the electrode plate if the connected component similar to the preset defect region does not exist includes: if the connected component similar to the preset defect region does not exist in either of defect detection regions corresponding to the first electrode plate image and the second electrode plate image, calculating the coating region misalignment value of the electrode plate. Whether a defect exists in corresponding defect detection regions is respectively detected based on the electrode plate images obtained by photographing the two faces of the electrode plate, and when it is determined that the defect does not exist in the defect detection regions of the two electrode plate images, the coating region misalignment value of the electrode plate is calculated, so that defect detection accuracy of the insulation coating region of the electrode plate is improved.

In an embodiment, the electrode plate image includes a first electrode plate image and a second electrode plate image that are obtained by photographing the two faces of the electrode plate. The calculating a coating region misalignment value of the electrode plate includes: performing edge finding on a defect detection region in an insulation coating region in the first electrode plate image to obtain a first approximate electrode plate edge and a first insulation edge; performing edge finding on a defect detection region in an insulation coating region in the second electrode plate image to obtain a second approximate electrode plate edge and a second insulation edge; obtaining a first insulation coating region width through calculation based on the first approximate electrode plate edge and the first insulation edge, and obtaining a second insulation coating region width through calculation based on the second approximate electrode plate edge and the second insulation edge; and obtaining the coating region misalignment value of the electrode plate through calculation based on the first insulation coating region width and the second insulation coating region width. The edge finding is performed based on the defect detection regions of the insulation coating regions in the two electrode plate images to find the corresponding approximate electrode plate edges and the corresponding insulation edges, the insulation coating region widths in the two electrode plate images are obtained through calculation based on the approximate electrode plate edges and the insulation edges, and finally the coating region misalignment value of the electrode plate can be accurately calculated based on the insulation coating region widths in the two electrode plate images.

In an embodiment, the performing edge finding on a defect detection region in an insulation coating region in the first electrode plate image to obtain a first approximate electrode plate edge and a first insulation edge includes: finding edge points of the defect detection region of the insulation coating region in the first electrode plate image; and performing fitting based on the found edge points to obtain the first approximate electrode plate edge and the first insulation edge. The edge points of the defect detection region of the insulation coating region are found, and then the fitting is performed based on the found edge points to determine the approximate electrode plate edge and the insulation edge, so that a finding success rate of the approximate electrode plate edge and the insulation edge is increased.

In an embodiment, after the performing defect detection on the defect detection region to obtain a defect detection result, the method further includes: binding the defect detection result with electrode plate identification information. The defect detection result is bound with the electrode plate identification information, so that the defect detection result is bound with the specific electrode plate, and data support is provided for subsequent operations such as scrapping of the electrode plate.

According to a second aspect, the present application provides an apparatus for detecting a defect on an insulation coating on a battery electrode plate, including:

- an image obtaining module configured to obtain an electrode plate image obtained by photographing an electrode plate, where the electrode plate image includes at least one entire electrode plate;
- an image analysis module configured to determine an insulation coating region and a tab region in the electrode plate image;
- a region extraction module configured to determine a defect detection region in the insulation coating region in the electrode plate image based on the insulation coating region and the tab region; and
- a defect analysis module configured to perform defect detection on the defect detection region to obtain a defect detection result.

According to a third aspect, the present application provides a computer device. The computer device includes a processor and a memory. The memory stores a computer program. The processor, when executing the computer program, implements the steps of the above method.

According to a fourth aspect, the present application provides a computer-readable storage medium storing a computer program. The computer program, when executed by a processor, implements the steps of the above method.

According to a fifth aspect, the present application provides a computer program product including a computer program. The computer program, when executed by a processor, implements the steps of the above method.

In a sixth aspect, the present application provides a system for detecting a defect on a battery electrode plate, including an image obtaining apparatus and a host computer. The image obtaining apparatus is configured to obtain an electrode plate image obtained by photographing an electrode plate, and send the electrode plate image to the host computer. The host computer is configured to perform detection on a defect on an insulation coating on the battery electrode plate by using the above method.

Details of one or more embodiments of the present application will be described in the accompanying drawings and the description below. Other features, objectives and advantages of the present application will become apparent from the specification, the accompanying drawings and the claims.

BRIEF DESCRIPTION OF THE DRAWINGS

In order to more clearly illustrate the technical solutions in the embodiments of the present application or in the prior art, the accompanying drawings to be used in the description of the embodiments or the prior art will be described briefly below. Obviously, the accompanying drawings in the following description are merely some embodiments of the present application. For those of ordinary skill in the art, other accompanying drawings may also be derived from these accompanying drawings without involving any inventive effort.

DETAILED DESCRIPTION

Figure 1:
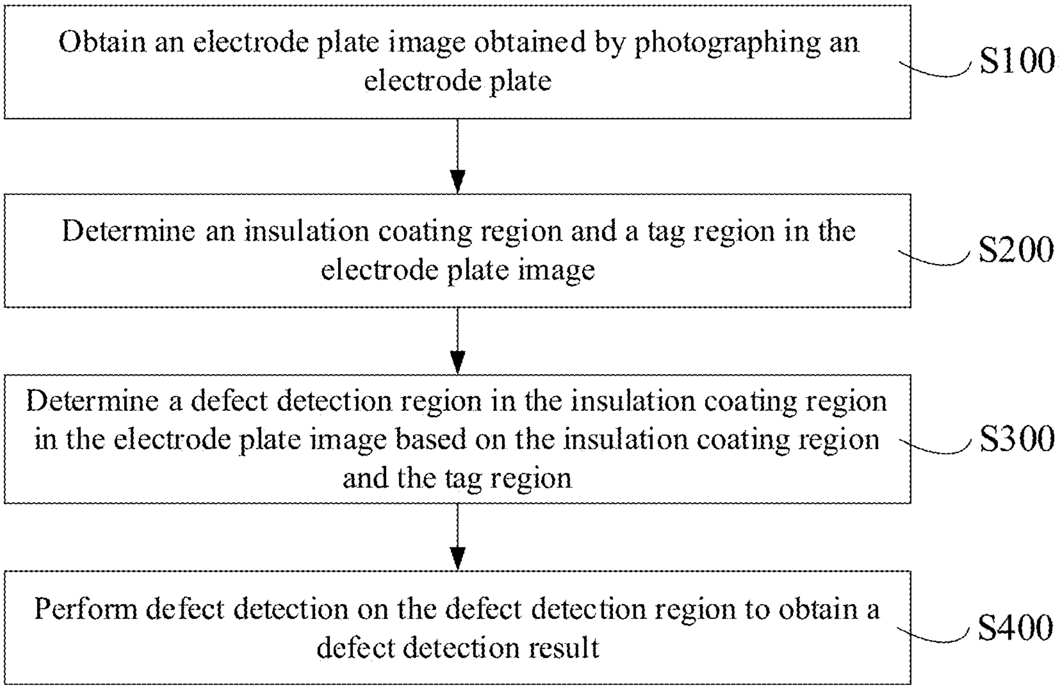
FIG. 1 is a flowchart of a method for detecting a defect on an insulation coating on a battery electrode plate according to an embodiment.

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "mount", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

With the development of science and technology and the continuous progress of society, the application fields of power batteries continue to expand. They are not only used in electric bicycles, electric motorcycles, electric vehicles, and other electric transportation vehicles, but also used in the fields of military equipment, aerospace, etc. Power batteries are power supplies that supply power to tools, mostly are valve-regulated sealed lead-acid batteries, open tubular lead-acid batteries, and lithium iron phosphate batteries, and have characteristics such as high energy, high power, and high energy density. In conventional detection of a defect on a battery electrode plate, two sets of image sensors (for front and back sides) are used to capture images to obtain distances between active substance coatings of the electrode plate and an edge of the electrode plate, a misalignment value of the coatings is obtained through calculation, a control system performs closed-loop control, and a coating region is adjusted until the misalignment value is less than a specified value. An existing defect detection method is limited to detection in a coating stage/die cutting stage of preprocessing, and only involves detection in the coating stage and detection of a coating region misalignment value instead of detection for an electrode plate before manufacturing of a cell by stacking. As a result, damage during conveying cannot be effectively managed and controlled, and data cannot be accurately bound with a specific electrode plate and a specific cell. In view of this, the present application provides a method for detecting a defect on an insulation coating on a battery electrode plate. An electrode plate image including at least one complete electrode plate is obtained by photographing an electrode plate. An insulation coating region and a tab region in the electrode plate image are determined. Then, a defect detection region in the insulation coating region in the electrode plate image is determined based on the insulation coating region and the tab region. Finally, defect detection is performed on the defect detection region to obtain a defect detection result. The method implements detection on the insulation coating on the electrode plate before combination, and can accurately detect whether a defect exists in the insulation coating region, whether a defect exists in a tab, and whether insulation coating regions on both sides of the electrode plate have the same dimensional widths. The method can perform detection before combination and be linked with a device, so that a defective electrode plate with an abnormal size is scrapped in a timely manner, and operating efficiency of the device is improved.

The method for detecting a defect on an insulation coating on a battery electrode plate provided in this embodiment of the present application may be applied to an operating process of a device on a battery production line, for example, for performing defect detection on the insulation coating on the battery electrode plate in a stacking, winding, or coating process. The insulation coating on the battery electrode plate may be specifically a ceramic coating, an aluminum oxide coating, or the like. The ceramic coating may be made of silicon carbide ceramic or silicon nitride ceramic. In an example in which detection is performed on a defect on an insulation coating on a battery electrode plate in a material coil conveying process on a stacking device, cameras may be disposed on two sides of an electrode plate conveyor belt at a lower negative electrode plate camera station and an upper negative electrode plate camera station, respectively. A negative electrode plate on the electrode plate conveyor belt is photographed by using the cameras on the two sides to obtain an electrode plate image. The electrode plate image is processed to determine an insulation coating region and a tab region in the electrode plate image. A defect detection region in the insulation coating region in the electrode plate image is determined based on the insulation coating region and the tab region. Finally, defect detection is performed on the defect detection region to obtain a defect detection result. Further, the defect detection includes detection of a misalignment value of and a defect on the insulation coating region and a defect on a tab, and binding and storage of data, so that detection of a defect on a tab on one side of an insulation coating on the negative electrode plate, and a defect on and a size of the insulation coating region is implemented before electrode plate combination on the stacking device. It should be noted that the battery involved in this embodiment of the present application may be used in, but not limited to, power consuming apparatuses such as vehicles, ships, or aircrafts.

In an embodiment, there is provided a method for detecting a defect on an insulation coating on a battery electrode plate, which is suitable for detecting a defect on an insulation coating on a negative electrode plate before combination. As shown in FIG. 1, the method includes the following steps.

Step S100: Obtain an electrode plate image obtained by photographing an electrode plate.

The electrode plate image includes at least one complete electrode plate. One complete electrode plate includes one complete tab and expands to two sides by a specific range based on the tab. A specific range value of expansion may be set based on an actual product size of the electrode plate. Specifically, similarly in an example in which defect detection is performed on an electrode plate on a stacking device, an image obtaining apparatus may be used to photograph the electrode plate on the stacking device in a material coil conveying process to obtain an electrode plate image including at least one complete electrode plate, and then send the electrode plate image to a host computer, so that the image is subsequently processed by the host computer. The image obtaining apparatus may include a camera group, a sensor, and a controller. In an example of an upper negative electrode plate camera station, two cameras in the camera group may be respectively disposed on two sides of an electrode plate conveyor belt at the upper negative electrode plate camera station. The controller triggers the cameras to perform photographing when determining that the sensor senses a tab, or controls the cameras to periodically perform photographing based on a conveying speed of an electrode plate conveyor belt, and uploads the electrode plate image captured by the cameras to the host computer. In addition, a light source may be further disposed for each camera, to ensure that ambient brightness helps the camera better capture an image. The controller may be a programmable logic controller (PLC), a micro control unit (MCU), or the like. The camera may be a charge coupled device (CCD) camera. The sensor may be a photoelectric induction sensor. The host computer may be, but not limited to, various personal computers, notebook computers, smartphones, tablet computers, and portable wearable devices. The portable wearable device may be a smartwatch, a smart bracelet, a headset device, or the like.

Further, before the electrode plate is photographed, the cameras on the two sides may be further jointly calibrated to generate a calibration module, and coordinates of the two cameras are aligned, so that subsequent size calculation for images of front and back sides of the electrode plate is facilitated, and accurate calculation of a coating region misalignment value of the electrode plate is ensured. In addition, after the cameras obtain the electrode plate images through photographing, the controller may further upload electrode plate identification information of a current electrode plate to the host computer, so that the host computer binds and stores the defect detection result and the electrode plate identification information.

Step S200: Determine an insulation coating region and a tab region in the electrode plate image.

Figure 9:
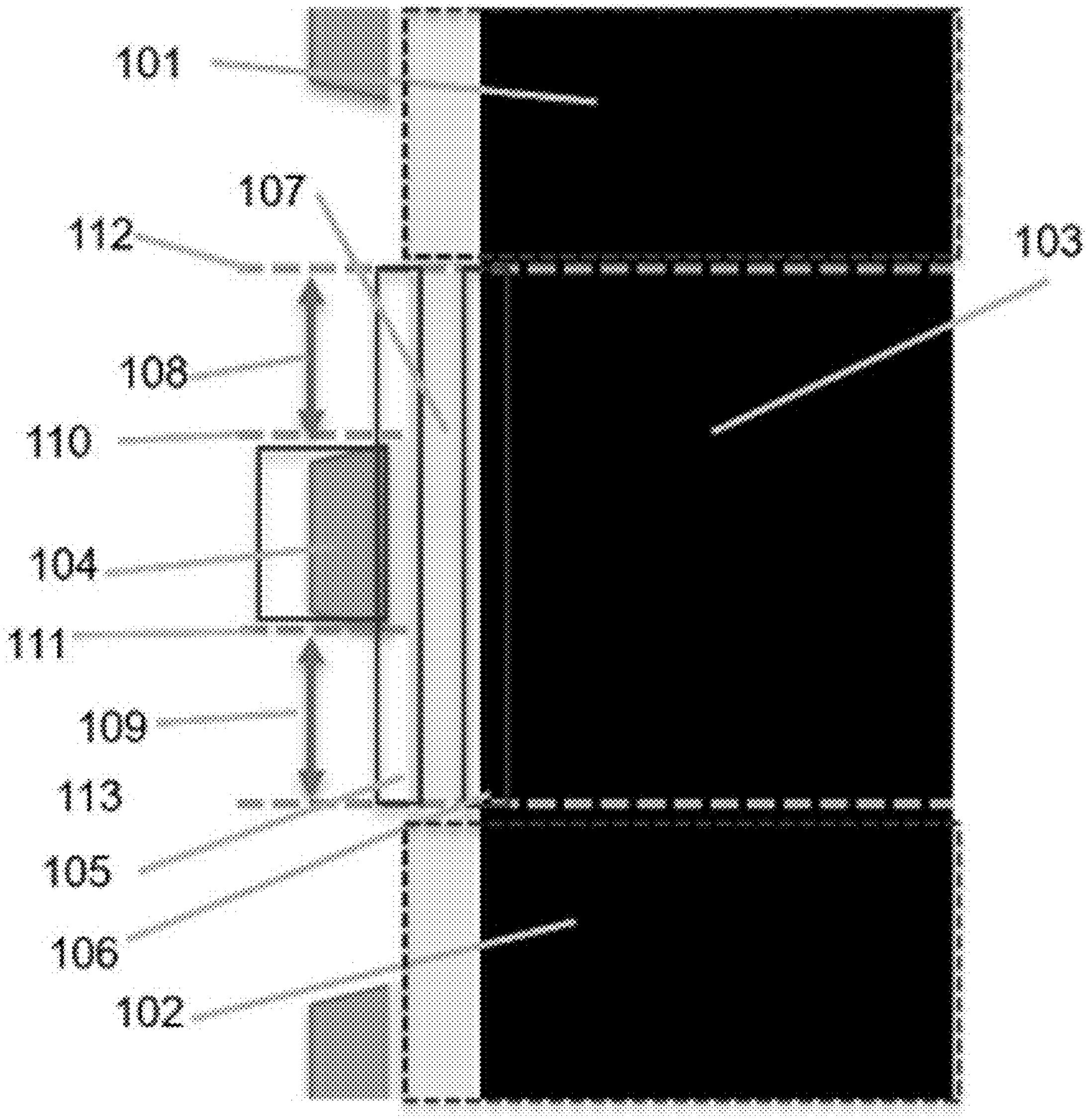
FIG. 9 is a schematic diagram of imaging of a camera according to an embodiment.

The insulation coating region is a region in which an insulation material coating is located in the electrode plate image. The tab region is a region in which a tab is located in the electrode plate image. Specifically, after obtaining the electrode plate image, the host computer analyzes image data of the electrode plate image, and performs image processing based on the image data, to find the insulation coating region and the tab region in the electrode plate image. The image data may be specifically a gray value. Processing and detection are performed on the electrode plate image in a manner of a gray difference, edge finding, or the like based on a gray value of each pixel in the electrode plate image, to find the insulation coating region and the tab region in the electrode plate image. The manner in which the host computer performs processing and detection on the electrode plate image is not unique. Specifically, an image detection direction may be pre-stored in the host computer based on a placement manner of the electrode plate on the electrode plate conveyor belt. For example, as shown in FIG. 9, if the electrode plate image obtained through photographing sequentially includes an active substance coating region 103, an insulation material coating region, and an electrode plate tab of the current electrode plate from right to left, the host computer performs gray difference and edge finding detection on the electrode plate image from right to left, to sequentially find the insulation coating region 107 and the tab region 104 in the electrode plate image.

Step S300: Determine a defect detection region in the insulation coating region in the electrode plate image based on the insulation coating region and the tab region.

The defect detection region is a target region in which defect detection is performed on the insulation coating of the current electrode plate. Specifically, after finding the insulation coating region and the tab region in the electrode plate image, the host computer finds an image boundary between different electrode plates based on the tab region, and determines a defect detection region in an insulation coating region of the current electrode plate in the electrode plate image based on the insulation coating region and the image boundary of the electrode plates as the target region in which subsequent defect detection is performed on the insulation coating of the current electrode plate.

Step S400: Perform defect detection on the defect detection region to obtain a defect detection result.

Correspondingly, after determining the defect detection region in the insulation coating region of the current electrode plate, the host computer may search the defect detection region for a defect based on preset defect region information, and determines whether the defect matching with the defect region information exists in the defect detection region, to obtain the defect detection result about whether the defect exists in the insulation coating region of the current electrode plate.

In addition, in an embodiment, after step S400, the method further includes: binding the defect detection result with electrode plate identification information. Specifically, the electrode plate identification information is information that can uniquely determine the electrode plate. A type of the electrode plate identification information is not unique, and may be specifically an electrode plate number, identification code, or the like. After binding the defect detection result with the electrode plate identification information, the host computer may store them in a local database or may send them to the controller in the image obtaining apparatus. The defect detection result is bound with the electrode plate identification information, so that the defect detection result is bound with the specific electrode plate, and data support is provided for subsequent operations such as scrapping of the electrode plate.

In the method for detecting a defect on an insulation coating on a battery electrode plate, the electrode plate image including at least one entire electrode plate is obtained by photographing the electrode plate, the insulation coating region and the tab region in the electrode plate image are determined, then the defect detection region of the insulation coating region in the electrode plate image is determined based on the insulation coating region and the tab region, and finally defect detection is performed on the defect detection region to obtain the defect detection result. The method implements detection on the insulation coating on the electrode plate before combination, and can detect whether a defect exists in the insulation coating region, so that a defective electrode plate is scrapped in a timely manner, detection accuracy is high, and operating efficiency of a stacking device is further improved.

Figure 2:
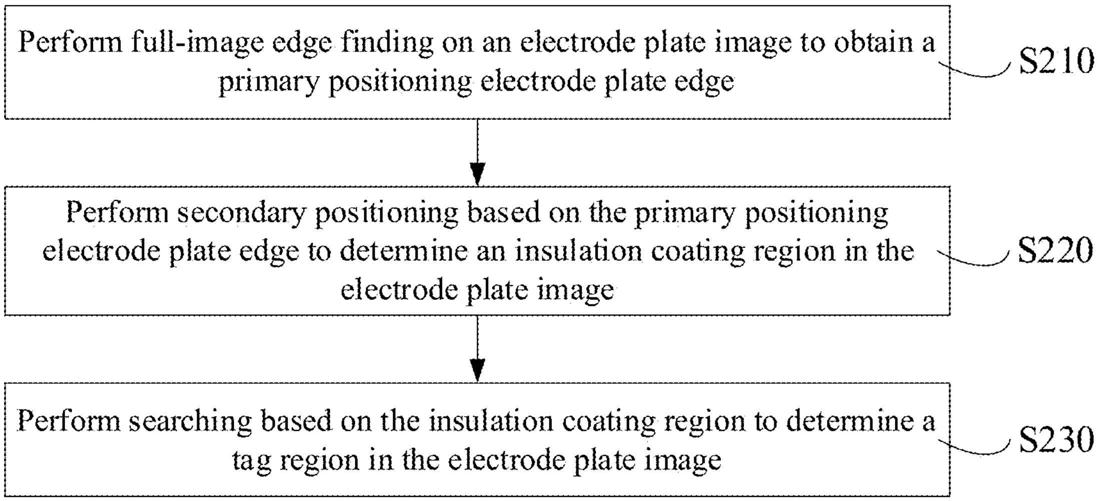
FIG. 2 is a flowchart of determining an insulation coating region and a tab region in an electrode plate image according to an embodiment.

In an embodiment, as shown in FIG. 2, step S200 includes step S210 to step S230.

Step S210: Perform full-image edge finding on the electrode plate image to obtain a primary positioning electrode plate edge.

Specifically, the host computer performs the full-image edge finding on the electrode plate image in a corresponding direction based on arrangement locations of different regions of the electrode plate, to find the primary positioning electrode plate edge in the electrode plate image. In an embodiment, step S210 includes: performing the full-image edge finding on the electrode plate image in a direction toward a tab from one side away from the tab to obtain the primary positioning electrode plate edge. As shown in FIG. 9, similarly in an example in which the electrode plate image sequentially includes the active substance coating region 103, the insulation material coating region, and the electrode plate tab of the current electrode plate from right to left, the host computer performs the full-image edge finding on the electrode plate image from right to left, to find the primary positioning electrode plate edge 106. The full-image edge finding is performed on the electrode plate image in the direction toward the tab from the side away from the tab, so that the primary positioning electrode plate edge can be accurately found.

Step S220: Perform secondary positioning based on the primary positioning electrode plate edge to determine the insulation coating region in the electrode plate image. Correspondingly, after determining the primary positioning electrode plate edge 106 in the electrode plate image, the host computer continues to perform secondary region positioning based on the primary positioning electrode plate edge 106 in the direction toward the tab, to find the insulation coating region 107 in the electrode plate image.

Step S230: Perform searching based on the insulation coating region to determine the tab region in the electrode plate image. After finding the insulation coating region 107 in the electrode plate image, the host computer continues to perform searching based on the insulation coating region 107 in the direction toward the tab, to find the tab region 104 in the electrode plate image.

In the above embodiments, the full-image edge finding and the secondary positioning are performed on the electrode plate image, to find the insulation coating region in the electrode plate image and then find the tab region in the electrode plate image based on the determined insulation coating region, so that different regions in the electrode plate image are found step by step, and detection is accurate and reliable.

Figure 3:
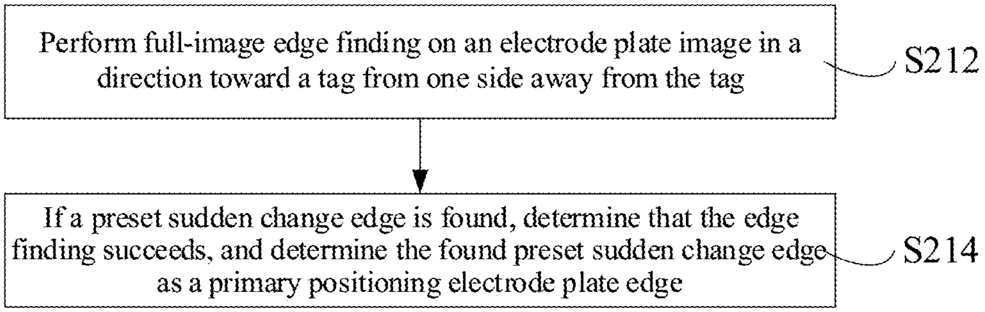
FIG. 3 is a flowchart of performing full-image edge finding on an electrode plate image in a direction toward a tab from one side away from the tab to obtain a primary positioning electrode plate edge according to an embodiment.

Further, in an embodiment, as shown in FIG. 3, step S210 of performing the full-image edge finding on the electrode plate image in a direction toward a tab from one side away from the tab to obtain the primary positioning electrode plate edge includes step S212 and step S214.

Step S212: Perform the full-image edge finding on the electrode plate image in the direction toward the tab from the side away from the tab. Correspondingly, similarly in an example in which the full-image edge finding is performed on the electrode plate image from right to left, the host computer searches for, based on gray values of different pixels in the electrode plate image from right to left, a first preset sudden change edge that suddenly changes from black to white. N (a specific value may be set) search boxes that expand from the left side of the image to the right side may be disposed in the electrode plate image at equal intervals. Each search box is responsible for detecting one edge point. Pixels in each search box are traversed from right to left to find a first edge point whose gray value changes to a set value. Then, whether edge points found by using all the search boxes can form a straight line through fitting and whether an included angle between the straight line obtained through the fitting and an edge in the electrode plate image is within a set range (for example, from 85 degrees to 95 degrees) are determined by using a linear fitting algorithm. If a straight line whose included angle from the edge in the electrode plate image is within the set range can be found, it is considered that a preset sudden change edge is found.

Step S214: If the preset sudden change edge is found, determine that the edge finding succeeds, and determine the found preset sudden change edge as the primary positioning electrode plate edge. If the preset sudden change edge is found, the host computer determines that the edge finding succeeds, and determines the found preset sudden change edge as the primary positioning electrode plate edge.

In the above embodiments, when the full-image edge finding is performed on the electrode plate image in the direction toward the tab from the side away from the tab, whether the preset sudden change edge can be found is analyzed, and the preset sudden change edge serves as the primary positioning electrode plate edge if being found, so that edge finding accuracy is further improved.

In addition, in an embodiment, the method further includes: if the preset sudden change edge is not found, determining that the edge finding fails, and binding electrode plate edge finding failure information with the electrode plate identification information. If the electrode plate edge finding fails, a subsequent region searching operation does not need to be performed, defect detection of the insulation coating on the battery electrode plate ends, and the electrode plate edge finding failure information and the electrode plate identification information are bound and then stored in the local database or sent to the controller.

In an embodiment, step S220 includes: determining a target insulation coating region based on the primary positioning electrode plate edge, and performing extraction on the target insulation coating region to determine the insulation coating region in the electrode plate image.

Specifically, the host computer may pre-store a size of the insulation coating region of the electrode plate. As shown in FIG. 9, after searching from right to left to obtain the primary positioning electrode plate edge 106 in the electrode plate image, the host computer performs the secondary positioning on the insulation coating region from the primary positioning electrode plate edge 106 to the left side, and determines a detection interested region whose size is greater than or equal to the size of the insulation coating region on the left side of the primary positioning electrode plate edge as the target insulation coating region. Further, the host computer performs region extraction based on the target insulation coating region, for example, extracting the insulation coating region 107 in the electrode plate image by using a Blob algorithm. Blob in computer vision refers to a connected component in an image. The Blob algorithm performs extraction and marking of the connected component on a binary image obtained through foreground/background separation of the image. The connected component in the binary image is analyzed to extract the insulation coating region in the electrode plate image.

In the above embodiments, after the target insulation coating region is determined based on the primary positioning electrode plate edge, the insulation coating region in the electrode plate image is extracted based on the target insulation coating region, so that the insulation coating region is conveniently and rapidly found.

Figure 4:
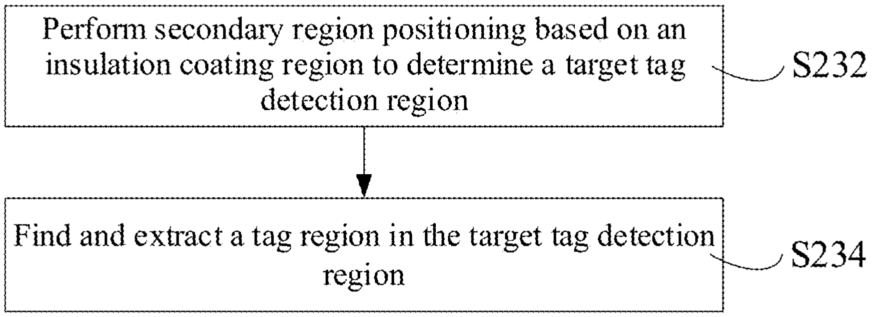
FIG. 4 is a flowchart of performing searching based on an insulation coating region to determine a tab region in an electrode plate image according to an embodiment.

In an embodiment, as shown in FIG. 4, step S230 includes step S232 and step S234.

Step S232: Perform secondary region positioning based on the insulation coating region to determine a target tab detection region. After determining the insulation coating region in the electrode plate image, the host computer continues to perform the secondary region positioning based on the insulation coating region in the direction toward the tab, to determine the target tab detection region.

In an embodiment, step S232 includes: extracting a primary positioning insulation edge of the insulation coating region; and determining the target tab detection region based on the primary positioning insulation edge. Specifically, as shown in FIG. 9, after finding the insulation coating region 107 in the electrode plate image, the host computer uses an edge of the insulation coating region 107 in a direction close to the tab, specifically, an edge on the leftmost side of the insulation coating region 107, as the primary positioning insulation edge 105 of the insulation coating region 107. Further, the host computer may further pre-store a size of the tab of the electrode plate, performs secondary positioning at a location of the obtained primary positioning insulation edge 105, and determines a tab detection box whose size is greater than or equal to the size of the tab on the left side of the primary positioning insulation edge 105 as the target tab detection region. The primary positioning insulation edge of the ceramic coating region is extracted, and the target tab detection region is selected based on the primary positioning insulation edge, so that the target tab detection region can be rapidly and accurately determined.

In addition, in an embodiment, the method may further include: if the extraction of the primary positioning insulation edge of the insulation coating region fails, binding the insulation edge finding failure information with the electrode plate identification information. If the edge finding of the primary positioning insulation edge fails, a subsequent operation does not need to be performed neither, defect detection of the insulation coating on the battery electrode plate ends, and the insulation edge finding failure information and the electrode plate identification information are bound and then stored in the local database or sent to the controller.

Step S234: finding and extracting the tab region in the target tab detection region. After determining the target tab detection region, the host computer performs image analysis on the target tab detection region to extract the tab region.

In an embodiment, step S234 includes: extracting a region having a tab gray feature in the target tab detection region to obtain a primary tab region; and determining, based on a region shape and a region size of the primary tab region, whether the primary tab region is a tab, and if the primary tab region is a tab, determining that the tab region is obtained. Specifically, the host computer performs binary processing on an image in the target tab detection region, performs gray value analysis on an image obtained through binary processing, and extracts the region having the tab gray feature as the primary tab region. Further, the host computer then analyzes the region shape and the region size of the primary tab region based on a preset tab feature parameter, determines whether the primary tab region is a tab, and if the primary tab region is a tab, finds the tab region 104. The tab feature parameter may include a tab shape, a tab size, and another parameter. If the region shape and the region size of the primary tab region are the same as the preset tab shape and the preset tab size, or if a difference is within a preset allowed range, it may be considered that the region shape and the region size of the primary tab region are consistent with the tab feature parameter, and it is determined that the primary tab region is a tab. Primary screening is performed on the target tab detection region based on the tab gray feature to determine the primary tab region, and whether the tab region is found is analyzed based on the region shape and the region size of the primary tab region, so that finding accuracy of the tab region can be ensured.

In the above embodiments, the secondary region positioning is performed based on the insulation coating region, and after the target tab detection region is determined, the tab region is found based on the target tab detection region, so that the tab region can also be conveniently and rapidly found.

In addition, in an embodiment, the method may further include: if it is determined that the primary tab region is not a tab, binding tab non-existence information with the electrode plate identification information. If the tab does not exist, a subsequent operation does not need to be performed neither, defect detection of the insulation coating on the battery electrode plate ends, and the tab non-existence information and the electrode plate identification information are bound and then stored in the local database or sent to the controller.

Figure 5:
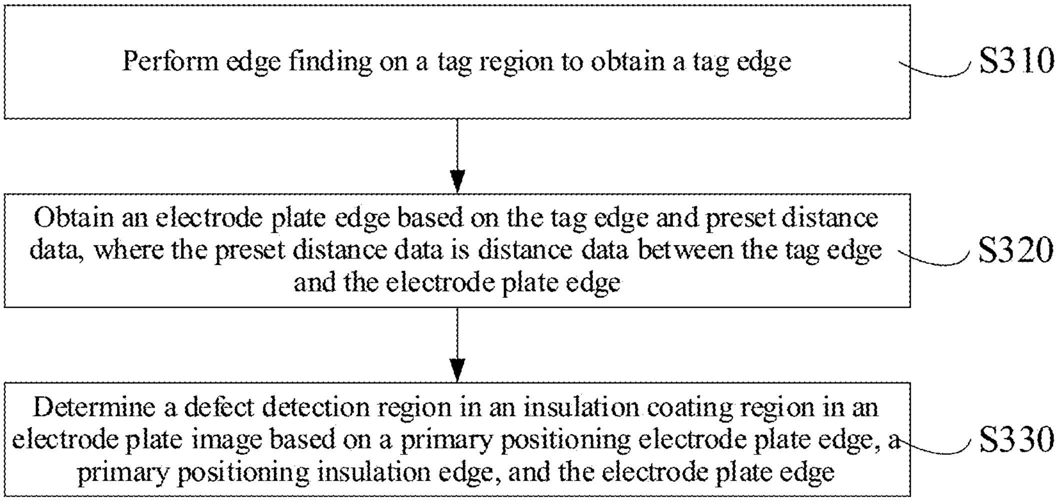
FIG. 5 is a flowchart of determining a defect detection region in an insulation coating region in an electrode plate image based on an insulation coating region and a tab region according to an embodiment.

In an embodiment, as shown in FIG. 5, step S300 includes step S310 to step S330.

Step S310: Perform edge finding on the tab region to obtain a tab edge. After finding the tab region, the host computer may perform the edge finding on the tab region in a direction parallel to the primary positioning insulation edge to find the tab edge. As shown in FIG. 9, similarly in an example in which the primary positioning electrode plate edge 106 and the primary positioning insulation edge 105 are found in the electrode plate image step by step from right to left, the host computer performs edge finding on the tab edge in the tab region 104 in a vertical direction by using an edge finding algorithm to find an upper tab edge 110 and a lower tab edge 111. Specifically, edge finding boxes for two tab edges may be first determined on the upper edge and the lower edge of the tab region 104 at a location of the tab region 104. Then, pixels are traversed in a vertical direction in each edge finding box to find edge points whose gray values change to a preset value. If a plurality of edge points found in a same edge finding box form a straight line through fitting, finding of the tab edge in the edge finding box succeeds.

Step S320: Obtain an electrode plate edge based on the tab edge and preset distance data. The preset distance data is distance data between the tab edge and the electrode plate edge. A specific value of the preset distance data may be set based on a distance between the electrode plate edge and the tab edge in an actual product. Specifically, as shown in FIG. 9, the electrode plate edge includes an upper electrode plate edge 112 and a lower electrode plate edge 113. After the tab edge is found, the preset distance data may be added at a location of the upper tab edge 110 to find the upper electrode plate edge 112, and the preset distance data may be added at the location of the lower tab edge 111 to find the lower electrode plate edge 113.

Step S330: Determine the defect detection region of the insulation coating region in the electrode plate image based on the primary positioning electrode plate edge, the primary positioning insulation edge, and the electrode plate edge. Correspondingly, after determining the primary positioning electrode plate edge 106, the primary positioning insulation edge 105, and the upper electrode plate edge 112, and the lower electrode plate edge 113, the host computer generates the defect detection region of the insulation coating region 107 of the current electrode plate through fitting of the four edges.

In the above embodiments, after the tab region is found, the electrode plate edge is determined based on the tab edge and the preset distance data, and the defect detection region of the insulation coating region can be accurately found based on the primary positioning electrode plate edge, the primary positioning insulation edge, and the electrode plate edge, so that defect detection is subsequently performed.

In addition, in an embodiment, the method further includes: if the edge finding of the tab region fails, binding tab edge finding failure information with the electrode plate identification information and then performing outputting. If the edge finding of the tab region fails, a subsequent operation does not need to be performed neither, defect detection of the insulation coating on the battery electrode plate ends, and the tab edge finding failure information and the electrode plate identification information are bound and then stored in the local database or sent to the controller.

Figure 6:
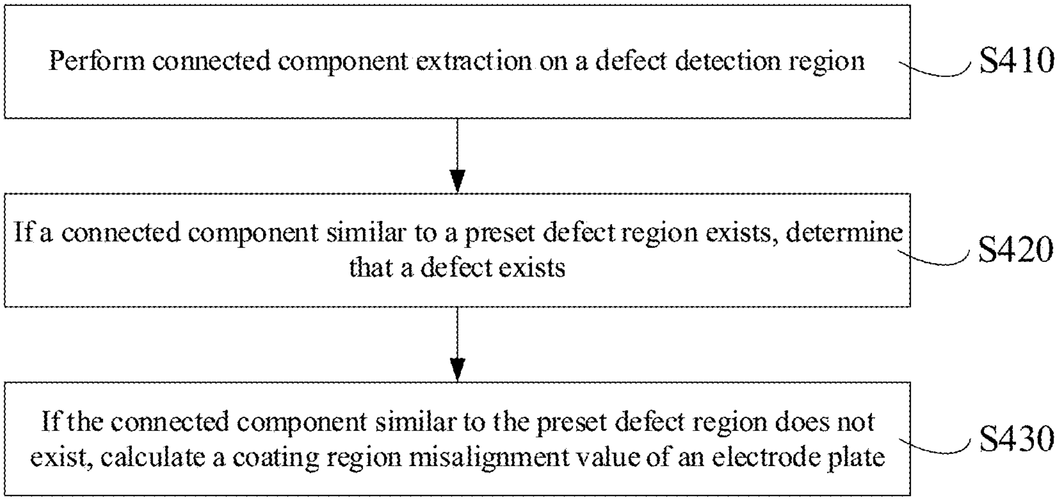
FIG. 6 is a flowchart of performing defect detection on a defect detection region to obtain a defect detection result according to an embodiment.

In an embodiment, as shown in FIG. 6, step S400 includes step S410 and step S420.

Step S410: Perform connected component extraction on the defect detection region. A connected component refers to a set of adjacent pixels whose gray values are within a same set range in the defect detection region. After determining the defect detection region of the insulation coating region of the current electrode plate, the host computer may also perform processing on the defect detection region by using the Blob algorithm to obtain the connected component in the binary image obtained through the processing.

Step S420: If a connected component similar to a preset defect region exists, determine that a defect exists. The defect detection result includes defect existence information. Corresponding preset defect region information may be pregenerated and stored in the host computer based on a defect that may actually appear in the insulation coating region of the electrode plate. The preset defect region information may include a location, a shape, and a size of the preset defect region and another information. The host computer analyzes whether the connected component of the defect detection region is similar to the preset defect region based on the preset defect region information. For example, if location, shape, and size similarities between the connected component of the defect detection region and the preset defect region are respectively greater than corresponding set thresholds, it may be considered that the connected component is similar to the preset defect region, and then it is determined that a defect exists in the defect detection region.

In the above embodiments, the connected component in the defect detection region is extracted and compared with the preset defect region, and whether a defect exists in the defect detection region is analyzed, so that detection is accurate and efficient.

It should be noted that when whether a defect exists in the insulation coating region of the current electrode plate is detected, the two cameras may be used to photograph a combination face and a non-combination face of the electrode plate to obtain two electrode plate images respectively, the two electrode plate images are synchronously analyzed to determine defect detection regions of insulation coating regions in the two electrode plate images, and then whether the connected component similar to the preset defect region exists in the defect detection regions in the two electrode plate images is detected. If the connected component similar to the preset defect region does not exist in either of the defect detection regions in the two electrode plate images, it is considered that a defect does not exist in the insulation coating region of the current electrode plate. If the connected component similar to the preset defect region is detected in one or two defect detection regions in the electrode plate images, it is considered that a defect exists in the insulation coating region of the current electrode plate.

In another embodiment, the above method may further perform image analysis on one electrode plate image through step S100 to step S400, to find the defect detection region in the electrode plate image and analyze whether the connected component similar to the preset defect region exists. It the connected component similar to the preset defect region exists, it is considered that a defect exists in the insulation coating region of the current electrode plate, and the other electrode plate image does not need to be analyzed. If the connected component similar to the preset defect region does not exist, through step S100 to step S400, a defect detection region in the other electrode plate image is found, and whether the connected component similar to the preset defect region exists is analyzed. If the connected component similar to the preset defect region does not exist in the defect detection region in the other electrode plate image neither, it is considered that a defect does not exist in the insulation coating region of the current electrode plate.

Otherwise, it is also considered that a defect exists in the insulation coating region of the current electrode plate. In addition, if it is determined that a defect exists in the preset defect region, the host computer binds the defect existence information and the electrode plate identification information and then stores in the local database or sends to the controller.

Further, in an embodiment, step S400 further includes step S430: if the connected component similar to the preset defect region does not exist, calculating a coating region misalignment value of the electrode plate. The defect detection result includes defect non-existence information and the coating region misalignment value. Specifically, if the connected component similar to the preset defect region does not exist in either of the defect detection regions in the two electrode plate images obtained by photographing the current electrode plate, it is considered that a defect does not exist in the insulation coating of the current electrode plate, and a coating region misalignment value of the current electrode plate is calculated based on the two electrode plate images. In addition, after binding the defect non-existence information and the coating region misalignment value with the electrode plate identification information, the host computer may further store them in the local database or send them to the controller.

In the above embodiments, when a defect does not exist in the defect detection region of the insulation coating region, the coating region misalignment value of the electrode plate is further calculated to analyze whether insulation coating regions on both sides of the electrode plate have the same dimensional widths, so that an electrode plate with an abnormal size is scrapped, and defect detection accuracy of the battery electrode plate is further improved.

In an embodiment, the electrode plate image includes a first electrode plate image and a second electrode plate image that are obtained by photographing the two faces of the electrode plate. Step S430 includes: if the connected component similar to the preset defect region does not exist in either of defect detection regions corresponding to the first electrode plate image and the second electrode plate image, calculating the coating region misalignment value of the electrode plate. The first electrode plate image and the second electrode plate image are respectively the electrode plate images obtained by photographing the combination face and the non-combination face of the current electrode plate. When the connected component similar to the preset defect region does not exist in either of the defect detection regions in the two electrode plate images, the host computer determines that a defect does not exist in the insulation coating of the current electrode plate, and calculates the coating region misalignment value of the electrode plate. Whether a defect exists in the corresponding defect detection regions is respectively detected based on the electrode plate images obtained by photographing the two faces of the electrode plate, and when it is determined that the defect does not exist in the defect detection regions of the two electrode plate images, the coating region misalignment value of the electrode plate is calculated, so that defect detection accuracy of the insulation coating region of the electrode plate is improved.

Figure 7:
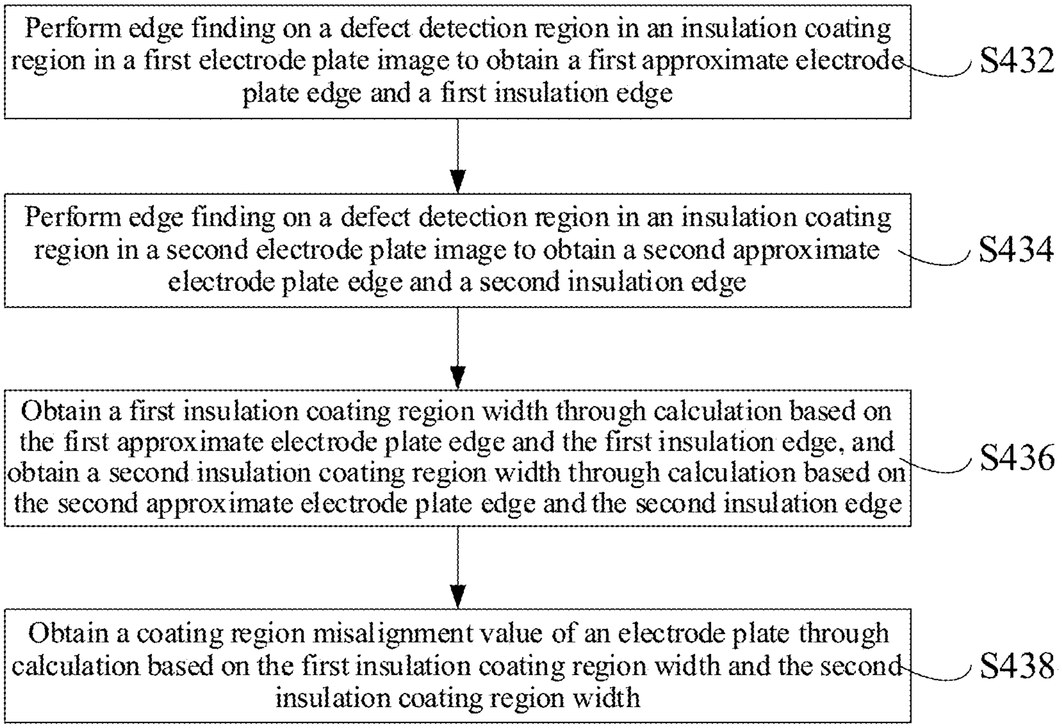
FIG. 7 is a flowchart of calculating a coating region misalignment value of an electrode plate according to an embodiment.

Further, in an embodiment, the electrode plate image includes a first electrode plate image and a second electrode plate image that are obtained by photographing the two faces of the electrode plate. As shown in FIG. 7, step S430 of calculating the coating region misalignment value of the electrode plate includes step S432 to step S438.

Step S432: Perform edge finding on a defect detection region in an insulation coating region in the first electrode plate image to obtain a first approximate electrode plate edge and a first insulation edge. Specifically, when the defect detection region of the insulation coating region in the first electrode plate image is determined and it is determined that the connected component similar to the preset defect region does not exist in the defect detection region, the edge finding is performed on the defect detection region to find the first approximate electrode plate edge and the first insulation edge in the first electrode plate image.

In an embodiment, step S432 includes: finding edge points of the defect detection region of the insulation coating region in the first electrode plate image; and performing fitting based on the found edge points to obtain the first approximate electrode plate edge and the first insulation edge. Specifically, an insulation edge finding box and an approximate electrode plate edge finding box of the current electrode plate are determined based on the defect detection region of the insulation coating region of the current electrode plate in the first electrode plate image and based on the primary positioning electrode plate edge, the primary positioning insulation edge, the upper electrode plate edge, and the lower electrode plate edge. Then, the edge finding is performed in the insulation edge finding box and the approximate electrode plate edge finding box by using the edge finding algorithm. Edge points in the two edge finding boxes are found, and then the fitting is performed based on the edge points in each edge finding box to correspondingly obtain the first approximate electrode plate edge and the first insulation edge. The edge points of the defect detection region of the insulation coating region are found, and then the fitting is performed based on the found edge points to determine the approximate electrode plate edge and the insulation edge, so that a finding success rate of the approximate electrode plate edge and the insulation edge is increased.

Further, after finding the edge points of the defect detection region of the insulation coating region in the first electrode plate image, the method may further include a step of filtering the edge points, so that abnormal edge points are filtered out. Then, the fitting is performed based on remaining edge points obtained through filtering to correspondingly obtain the first approximate electrode plate edge and the first insulation edge. A manner of filtering the edge points is not unique. Specifically, the edge points may be filtered by using a fitting algorithm. For example, the abnormal edge points are filtered out by using a weighted least squares method based on a location of each edge point.

Step S434: Perform edge finding on a defect detection region in an insulation coating region in the second electrode plate image to obtain a second approximate electrode plate edge and a second insulation edge. It may be understood that a manner of performing the edge finding on the defect detection region of the insulation coating region in the second electrode plate image to obtain the second approximate electrode plate edge and the second insulation edge is similar to that in step S432, and details are not described herein again.

Step S436: Obtain a first insulation coating region width through calculation based on the first approximate electrode plate edge and the first insulation edge, and obtain a second insulation coating region width through calculation based on the second approximate electrode plate edge and the second insulation edge. After finding the first approximate electrode plate edge and the first insulation edge in the first electrode plate image and the second approximate electrode plate edge and the second insulation edge in the second electrode plate image, the host computer calculates a distance between the first approximate electrode plate edge and the first insulation edge to obtain the insulation coating region width in the first electrode plate image, namely, the first insulation coating region width. Then, the host computer calculates a distance between the second approximate electrode plate edge and the second insulation edge to obtain the insulation coating region width in the second electrode plate image, namely, the second insulation coating region width.

Step S438: Obtain the coating region misalignment value of the electrode plate through calculation based on the first insulation coating region width and the second insulation coating region width. Correspondingly, the host computer uses a difference between the first insulation coating region width and the second insulation coating region width as the coating region misalignment value of the current electrode plate.

In the above embodiments, the edge finding is performed based on the defect detection regions of the insulation coating regions in the two electrode plate images to find the corresponding approximate electrode plate edges and the corresponding insulation edges, the insulation coating region widths in the two electrode plate images are obtained through calculation based on the approximate electrode plate edges and the insulation edges, and finally the coating region misalignment value of the electrode plate can be accurately calculated based on the insulation coating region widths in the two electrode plate images.

In addition, in an embodiment, the method may further include: if the edge points are not found, binding edge point finding failure information with the electrode plate identification information and then performing outputting. If finding of the edge points of the defect detection region in the first electrode plate image or the second electrode plate image fails, a subsequent operation does not need to be performed neither, defect detection of the insulation coating on the battery electrode plate ends, and the edge point finding failure information and the electrode plate identification information are bound and then stored in the local database or sent to the controller.

For better understanding of the method for detecting a defect on an insulation coating on a battery electrode plate, the following describes details in conjunction with specific embodiments.

Figure 8:
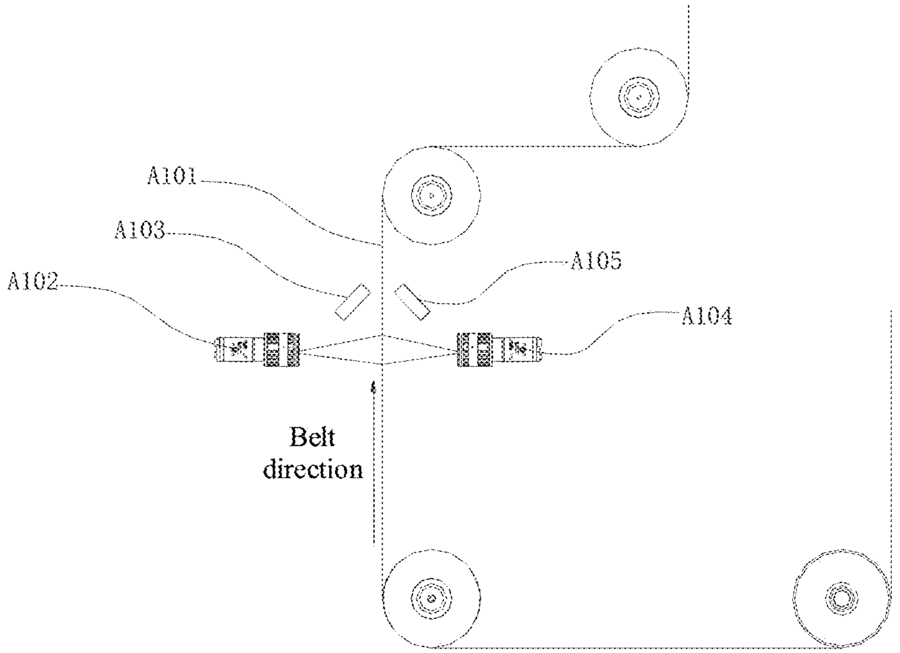
FIG. 8 is a schematic diagram of layout of hardware for detecting a defect on an insulation coating on a battery electrode plate according to an embodiment.

For the problem that existing battery electrode plate defect detection only involves detection of a coating period and detection of a coating region misalignment value instead of detection of a defect on an insulation coating and data cannot be bound with a specific electrode plate during detection in a coating process, the present application provides a method for online detecting a size defect on an insulation coating on a negative electrode plate before continuous stacking and combination of a positive electrode. The method implements detection on the insulation coating on the negative electrode plate before combination by using a high-efficiency and high-precision vision algorithm, and can accurately detect whether a defect exists in an insulation coating region, whether a defect exists in a tab, and whether insulation coating regions on both sides of the electrode plate have the same dimensional widths. The method can perform detection before combination and be linked with a device, so that a defective electrode plate with an abnormal size is scrapped in a timely manner, operating efficiency of the device is improved, and an omission risk is reduced. Specifically, FIG. 8 is a schematic diagram of layout of hardware for detecting a defect on an insulation coating. Two sides of a negative electrode plate conveyor belt are each provided with a high-frame-rate area-array camera, and provided with a white strip-shaped light source for irradiating an insulation coating region from one side. A101 is a negative electrode plate conveyor belt. A102 is a detection camera 1. A103 is a light source corresponding to the detection camera 1. A104 is a detection camera 2. A105 is a light source corresponding to the detection camera 2. The two sides of the electrode plate conveyor belt are each provided with a camera for photographing the insulation coating region. The cameras on the two sides are jointly calibrated to generate the calibration model. The PLC triggers the cameras to perform photographing after sensing a tab and provides unique identifier code of the current electrode plate. Processing and detection are performed on the image in a manner of a gray difference, edge finding, or the like by using vision software in the host computer, to implement the detection of the misalignment value and the defect on the insulation coating region and the defect on the tab and the binding and storage of data.

FIG. 9 is a schematic diagram of imaging of a camera according to an embodiment. Names of regions are as follows: 101: Previous negative electrode plate; 102: Next negative electrode plate; 103: Active substance coating region of a current negative electrode plate; 104: tab, namely, a tab region, of the current negative electrode plate; 105: Primary positioning insulation edge, namely, an outer edge of an insulation material coating region; 106: Approximate negative electrode plate edge/Primary positioning electrode plate edge, namely, a boundary between the active substance coating region of the negative electrode plate and the insulation material coating region; 107: Insulation material coating region, namely, an insulation coating region; 108: Offset between an upper tab edge and an upper edge of the current electrode plate; 109: Offset between a lower tab edge and a lower edge of the current electrode plate; 110: Upper tab edge; 111: Lower tab edge; 112: Upper electrode plate edge; 113: Lower electrode plate edge.

Figure 10:
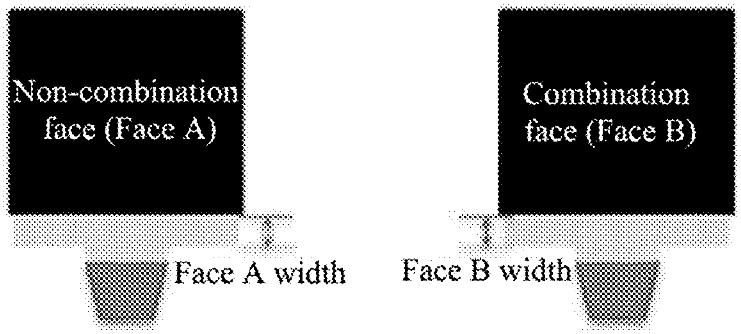
FIG. 10 is a schematic diagram of a method for calculating a misalignment value according to an embodiment.

FIG. 10 is a schematic diagram of a manner for calculating a misalignment value. A face A is obtained by photographing a non-combination face of an electrode plate. A face B is obtained by photographing a combination face of the electrode plate. Defect detection items of the defect detection method include: detection of a metal leakage damage defect on the region 106, detection of a width of the region 106, detection of a misalignment value of faces A and B of the region 106 along the width, and detection of tab missing of the region 104.

In the defect detection method, secondary positioning is accurately performed on a detection region based on a positioning electrode plate edge and an insulation coating region, a detection box is accurately positioned in a corresponding to-be-detected region, and detection is performed by using edge finding, size measurement, and defect detection algorithms to output a defect detection result. The insulation coating is detected on the stacking device, so that damage to the insulation coating in a material coil conveying process can be managed and controlled, electrode plate data can be provided for the device, and data support is provided for subsequent operations such as scraping. Each electrode plate is bound with a unique number and stored, so that data of an insulation coating of each electrode plate can be traced. The detection method has high detection precision, pixel precision of 0.02 mm, and high detection efficiency, and consumes less than 20 ms for single detection.

It should be understood that although the steps in the flowchart that are involved in the embodiments described above are displayed in sequence as indicated by arrows, these steps are not necessarily sequentially executed in the order indicated by the arrows. Unless explicitly described herein, the execution of these steps is not limited to a strict order, instead, the steps may be executed in another order. In addition, at least some of the steps in the flowchart that are involved in the embodiments described above may include multiple steps or multiple stages. These steps or stages are not necessarily executed or completed at the same moment, but can be executed at different moments. These steps or stages are also not necessarily executed in sequence, but can be executed in turn or alternately with at least some of other steps or steps or stages of other steps.

Based on the same inventive concept, an embodiment of the present application further provides an apparatus for detecting a defect on an insulation coating on a battery electrode plate, to implement the above method for detecting a defect on an insulation coating on a battery electrode plate. An implementation solution for solving the problems that is provided by the apparatus is similar to the implementation solution of the above method. Therefore, for specific definitions of one or more embodiments of the apparatus for detecting a defect of an insulation coating on a battery electrode plate provided below, reference may be made to the definitions of the above method for detecting a defect on an insulation coating on a battery electrode plate, and details are not described herein again.

Figure 11:
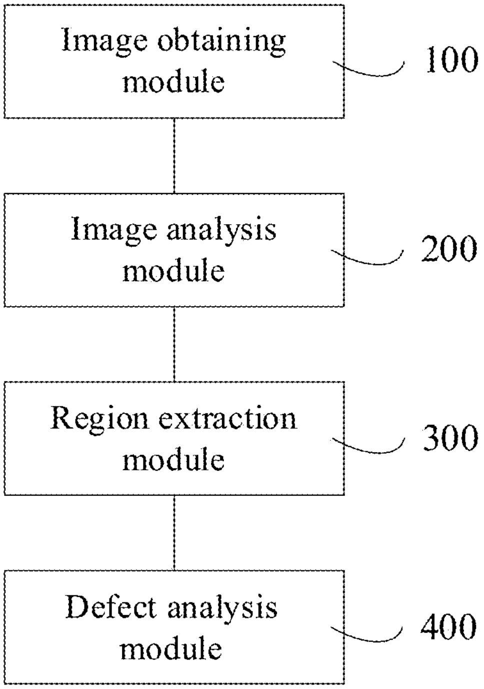
FIG. 11 is a block diagram of a structure of an apparatus for detecting a defect on an insulation coating on a battery electrode plate according to an embodiment.

In an embodiment, an apparatus for detecting a defect on an insulation coating on a battery electrode plate is provided and suitable for detecting a defect on an insulation coating on a negative electrode plate before combination. As shown in FIG. 11, the apparatus includes: an image obtaining module 100, an image analysis module 200, a region extraction module 300, and a defect analysis module 400.

The image obtaining module 100 is configured to obtain an electrode plate image obtained by photographing an electrode plate, where the electrode plate image includes at least one entire electrode plate.

The image analysis module 200 is configured to determine an insulation coating region and a tab region in the electrode plate image.

The region extraction module 300 is configured to determine a defect detection region in the insulation coating region in the electrode plate image based on the insulation coating region and the tab region.

The defect analysis module 400 is configured to perform defect detection on the defect detection region to obtain a defect detection result.

In an embodiment, the image analysis module 200 performs full-image edge finding on the electrode plate image to obtain a primary positioning electrode plate edge; performs secondary positioning based on the primary positioning electrode plate edge to determine the insulation coating region in the electrode plate image; and performs searching based on the insulation coating region to determine the tab region in the electrode plate image.

In an embodiment, the image analysis module 200 performs the full-image edge finding on the electrode plate image in a direction toward a tab from one side away from the tab to obtain the primary positioning electrode plate edge.

In an embodiment, the image analysis module 200 performs the full-image edge finding on the electrode plate image in the direction toward the tab from the side away from the tab; and if a preset sudden change edge is found, determines that the edge finding succeeds, and determines the found preset sudden change edge as the primary positioning electrode plate edge.

In an embodiment, the image analysis module 200 determines a target insulation coating region based on the primary positioning electrode plate edge, and performs extraction on the target insulation coating region to determine the insulation coating region in the electrode plate image.

In an embodiment, the image analysis module 200 performs secondary region positioning based on the insulation coating region to determine a target tab detection region; and finds and extracts the tab region in the target tab detection region.

In an embodiment, the image analysis module 200 extracts a primary positioning insulation edge of the insulation coating region; and determines the target tab detection region based on the primary positioning insulation edge.

In an embodiment, the image analysis module 200 extracts a region having a tab gray feature in the target tab detection region to obtain a primary tab region; and determines, based on a region shape and a region size of the primary tab region, whether the primary tab region is a tab, and if the primary tab region is the tab, determines that the tab region is obtained.

In an embodiment, the region extraction module 300 performs edge finding on the tab region to obtain a tab edge; obtains an electrode plate edge based on the tab edge and preset distance data, where the preset distance data is distance data between the tab edge and the electrode plate edge; and determines the defect detection region of the insulation coating region in the electrode plate image based on the primary positioning electrode plate edge, the primary positioning insulation edge, and the electrode plate edge.

In an embodiment, the defect analysis module 400 performs connected component extraction on the defect detection region; and if a connected component similar to a preset defect region exists, determines that a defect exists. The defect detection result includes defect existence information.

In an embodiment, the defect analysis module 400 further calculates a coating region misalignment value distance of the electrode plate if the connected component similar to the preset defect region does not exist. The defect detection result includes defect non-existence information and the coating region misalignment value.

In an embodiment, the electrode plate image includes a first electrode plate image and a second electrode plate image that are obtained by photographing two faces of the electrode plate. The defect analysis module 400 calculates the coating region misalignment value of the electrode plate when the connected component similar to the preset defect region does not exist in either of defect detection regions corresponding to the first electrode plate image and the second electrode plate image.

In an embodiment, the electrode plate image includes a first electrode plate image and a second electrode plate image that are obtained by photographing two faces of the electrode plate. The defect analysis module 400 performs edge finding on a defect detection region in an insulation coating region in the first electrode plate image to obtain a first approximate electrode plate edge and a first insulation edge; performs edge finding on a defect detection region in an insulation coating region in the second electrode plate image to obtain a second approximate electrode plate edge and a second insulation edge; obtains a first insulation coating region width through calculation based on the first approximate electrode plate edge and the first insulation edge, and obtains a second insulation coating region width through calculation based on the second approximate electrode plate edge and the second insulation edge; and obtains the coating region misalignment value of the electrode plate through calculation based on the first insulation coating region width and the second insulation coating region width.

In an embodiment, the defect analysis module 400 finds edge points of the defect detection region of the insulation coating region in the first electrode plate image; and performs fitting based on the found edge points to obtain the first approximate electrode plate edge and the first insulation edge.

In an embodiment, the defect analysis module 400 further binds the defect detection result with electrode plate identification information.

In an embodiment, a computer device is provided. The computer device may be a server or a terminal. Assuming that the computer device is a server, a diagram of an internal structure thereof may be shown in FIG. 12. The computer device includes a processor, a memory, and a network interface that are connected through a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for operation of the operating system and the computer program in the non-volatile storage medium. The database of the computer device is configured to store defect detection result data. The network interface of the computer device is configured to communicate with an external terminal through a network connection. The computer program, when executed by the processor, implements a method for detecting a defect on an insulation coating on a battery electrode plate.

Figure 12:
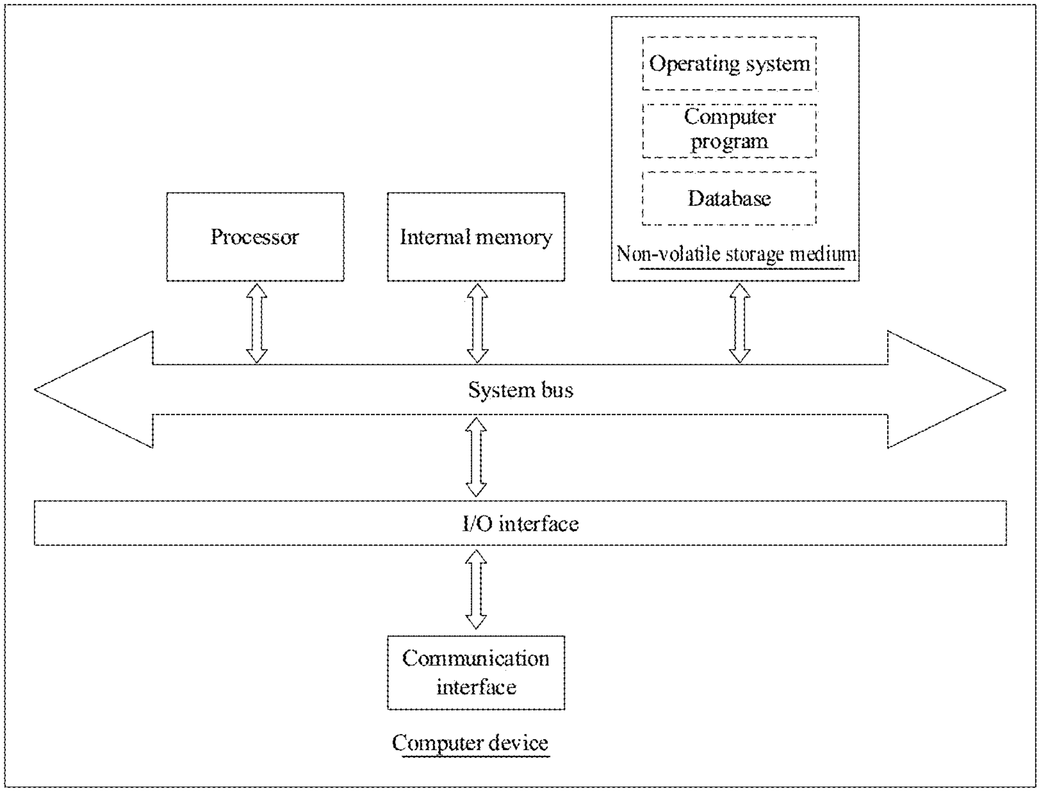
FIG. 12 is a diagram of an internal structure of a computer device according to an embodiment.

Those skilled in the art can understand that a structure shown in FIG. 12 is merely a block diagram of part of the structure related to the solutions of the present application, and does not constitute a limitation on the computer device to which the solutions of the present application are applied. Specifically, the computer device may include more or fewer components than those shown in the drawings, or combine some components, or have different component arrangements.

In an embodiment, a computer device is provided. The computer device includes a memory and a processor. The memory stores a computer program. The processor, when executing the computer program, implements the steps of the above method embodiments.

In an embodiment, a computer-readable storage medium is provided. The computer-readable storage medium stores a computer program. The computer program, when executed by a processor, implements the steps of the above method embodiments.

In an embodiment, a computer program product is provided. The computer program product includes a computer program. The computer program, when executed by a processor, implements the steps of the above method embodiments.

In an embodiment, a system for detecting a defect on a battery electrode plate is further provided. The system includes an image obtaining apparatus and a host computer. The image obtaining apparatus is configured to obtain an electrode plate image by photographing an electrode plate, and send the electrode plate image to the host computer. The host computer is configured to detect a defect on an insulation coating on the battery electrode plate according to the above method. The image obtaining apparatus specifically includes a camera group, a sensor, and a controller. The controller is connected to the camera group, the sensor, and the host computer. The controller may be a PLC, an MCU, or the like. The camera group may be a CCD camera group. The sensor may be a photoelectric induction sensor. The host computer may be, but not limited to, various personal computers, notebook computers, smartphones, tablet computers, and portable wearable devices. The portable wearable device may be a smartwatch, a smart bracelet, a headset, or the like.

Those of ordinary skill in the art can understand that all or some of the procedures in the methods of the above embodiments can be implemented by a computer program to instruct related hardware. The computer program can be stored in a computer-readable storage medium. The program, when executed, may include the procedures in the above method embodiments. The storage medium may be a non-volatile storage medium such as a magnetic disk, an optical disc, or a read-only memory (ROM), a random access memory (RAM), or the like.

The technical features of the above embodiments can be combined in any manner, and in order to simplify the description, not all possible combinations of the technical features of the above embodiments are described. However, as long as there is no conflict between the combinations of these technical features, they should be considered to be within the scope of the description in the present application.

The above embodiments merely represent several implementations of the present application, giving specifics and details thereof, but should not be understood as limiting the scope of the present patent of application thereby. It should be noted that several variations and improvements may also be made by those of ordinary skill in the art without departing from the concept of the present application, and should fall within the scope of protection of the present application. Therefore, the scope of protection of the present application shall be defined by the appended claims.

What is claimed is:

1. A method for detecting a defect on an insulation coating disposed on a battery electrode plate, comprising:

obtaining an electrode plate image by photographing an electrode plate, wherein the electrode plate image comprises at least one complete electrode plate;

determining an insulation coating region and a tab region in the electrode plate image;

determining a defect detection region in the insulation coating region in the electrode plate image based on the insulation coating region and the tab region; and performing defect detection on the defect detection region to obtain a defect detection result;

wherein performing the defect detection on the defect detection region to obtain the defect detection result comprises:

performing a connected component extraction on the defect detection region;

when a connected component similar to a predetermined defect region exists, determining that a defect exists, and the defect detection result comprises defect existence information; and when the connected component similar to the predetermined defect region does not exist, calculating a coating region misalignment value of the electrode plate, and the defect detection result comprises defect non-existence information and the coating region misalignment value.

2. The method according to claim 1, wherein the determining an insulation coating region and a tab region in the electrode plate image comprises:

performing full-image edge finding on the electrode plate image to obtain a primary positioning electrode plate edge;

performing secondary positioning based on the primary positioning electrode plate edge to determine the insulation coating region in the electrode plate image; and performing searching based on the insulation coating region to determine the tab region in the electrode plate image.

3. The method according to claim 2, wherein the performing full-image edge finding on the electrode plate image to obtain a primary positioning electrode plate edge comprises:

performing the full-image edge finding on the electrode plate image in a direction toward a tab from one side away from the tab to obtain the primary positioning electrode plate edge.

4. The method according to claim 3, wherein the performing the full-image edge finding on the electrode plate image in a direction toward a tab from one side away from the tab to obtain the primary positioning electrode plate edge comprises:

performing the full-image edge finding on the electrode plate image in the direction toward the tab from the side away from the tab; and when a predetermined sudden change edge is found, determining that the edge finding succeeds, and determining the found predetermined sudden change edge as the primary positioning electrode plate edge.

5. The method according to claim 2, wherein the performing secondary positioning based on the primary positioning electrode plate edge to determine the insulation coating region in the electrode plate image comprises:

determining a target insulation coating region based on the primary positioning electrode plate edge, and performing extraction on the target insulation coating region to determine the insulation coating region in the electrode plate image.

6. The method according to claim 2, wherein the performing searching based on the insulation coating region to determine the tab region in the electrode plate image comprises:

performing secondary region positioning based on the insulation coating region to determine a target tab detection region; and finding and extracting the tab region in the target tab detection region.

7. The method according to claim 6, wherein the performing secondary region positioning based on the insulation coating region to determine a target tab detection region comprises:

extracting a primary positioning insulation edge of the insulation coating region; and determining the target tab detection region based on the primary positioning insulation edge.

8. The method according to claim 6, wherein the finding and extracting the tab region in the target tab detection region comprises:

extracting a region having a tab gray feature in the target tab detection region to obtain a primary tab region; and determining, based on a region shape and a region size of the primary tab region, whether the primary tab region comprises a tab, and if the primary tab region comprises a tab, determining that the tab region is obtained.

9. The method according to claim 7, wherein the determining a defect detection region in the insulation coating region in the electrode plate image based on the insulation coating region and the tab region comprises:

performing edge finding on the tab region to obtain a tab edge;

obtaining an electrode plate edge based on the tab edge and preset distance data, wherein the preset distance data is distance data between the tab edge and the electrode plate edge; and determining the defect detection region in the insulation coating region in the electrode plate image based on the primary positioning electrode plate edge, the primary positioning insulation edge, and the electrode plate edge.

10. The method according to claim 1, wherein the electrode plate image comprises a first electrode plate image and a second electrode plate image that are obtained by photographing both sides of the electrode plate; and the calculating a coating region misalignment value of the electrode plate if the connected component similar to the predetermined defect region does not exist comprises:

when the connected component similar to the predetermined defect region does not exist in either of defect detection regions corresponding to the first electrode plate image and the second electrode plate image, calculating the coating region misalignment value of the electrode plate.

11. The method according to claim 1, wherein the electrode plate image comprises a first electrode plate image and a second electrode plate image that are obtained by photographing both sides of the electrode plate; and the calculating a coating region misalignment value of the electrode plate comprises:

performing edge finding on a defect detection region in an insulation coating region in the first electrode plate image to obtain a first approximate electrode plate edge and a first insulation edge;

performing edge finding on a defect detection region in an insulation coating region in the second electrode plate image to obtain a second approximate electrode plate edge and a second insulation edge;

obtaining a first insulation coating region width through calculation based on the first approximate electrode plate edge and the first insulation edge, and obtaining a second insulation coating region width through calculation based on the second approximate electrode plate edge and the second insulation edge; and obtaining the coating region misalignment value of the electrode plate through calculation based on the first insulation coating region width and the second insulation coating region width.

12. The method according to claim 11, wherein the performing edge finding on a defect detection region in an insulation coating region in the first electrode plate image to obtain a first approximate electrode plate edge and a first insulation edge comprises:

finding edge points of the defect detection region in the insulation coating region in the first electrode plate image; and performing fitting based on the found edge points to obtain the first approximate electrode plate edge and the first insulation edge.

13. The method according to claim 1, wherein after the performing defect detection on the defect detection region to obtain a defect detection result, the method further comprises:

binding the defect detection result with electrode plate identification information.

14. A computer device comprising a memory and a processor, wherein the memory stores a computer program; and the processor, when executing the computer program, implements steps of the method according to claim 1.

15. A non-transitory computer-readable storage medium storing a computer program, wherein the computer program, when executed by a processor, implements steps of the method according to claim 1.

16. A system for detecting a defect on a battery electrode plate, comprising an image obtaining apparatus and a host computer, wherein the image obtaining apparatus is configured to obtain an electrode plate image obtained by photographing an electrode plate, and send the electrode plate image to the host computer, and the host computer is configured to detect a defect on an insulation coating on the battery electrode plate by using the method according to claim 1.

* * * * *